United States Patent [19]

Boroczky et al.

[11] Patent Number: 6,040,861

[45] Date of Patent: Mar. 21, 2000

[54] ADAPTIVE REAL-TIME ENCODING OF VIDEO SEQUENCE EMPLOYING IMAGE STATISTICS

[75] Inventors: Lilla Boroczky, Endicott; Charlene Ann Gebler, Vestal; John M. Kaczmarczyk; Edward F. Westermann, both of Endicott; Robert L. Woodard, Newark Valley, all of N.Y.

[73] Assignee: International Business Machines Corporation, Armonk, N.Y.

[21] Appl. No.: 08/948,442

[22] Filed: Oct. 10, 1997

[51] Int. Cl.[7] .................................................. H04N 7/18
[52] U.S. Cl. ...................... 348/409; 370/276; 370/278; 382/236; 382/239; 395/800
[58] Field of Search .................................. 348/409, 404, 348/405, 700, 452, 412, 420

[56] References Cited

U.S. PATENT DOCUMENTS

| | | | |
|---|---|---|---|
| 4,395,732 | 7/1983 | Upton | 358/169 |
| 4,868,653 | 9/1989 | Golin et al. | 358/133 |
| 5,136,377 | 8/1992 | Johnston et al. | 358/136 |
| 5,196,930 | 3/1993 | Kadono et al. | 358/133 |
| 5,321,522 | 6/1994 | Eschbach | 358/433 |
| 5,400,075 | 3/1995 | Savatier | 348/384 |
| 5,440,346 | 8/1995 | Alattar et al. | 348/420 |
| 5,469,212 | 11/1995 | Lee | 348/412 |
| 5,781,788 | 7/1998 | Woo et al. | 370/276 |
| 5,793,895 | 8/1998 | Chang et al. | 348/402 |

*Primary Examiner*—Andy Rao
*Assistant Examiner*—Shawn An
*Attorney, Agent, or Firm*—Heslin & Rothenberg, P.C.

[57] ABSTRACT

Method, system and computer program product are provided for adaptively encoding in hardware, software or a combination thereof a sequence of video frames in real-time. A first encoding subsystem is employed to analyze the sequence of video frames to derive information on at least one characteristic thereof, such as motion statistics, non-motion statistics, scene change statistics, or scene fade statistics. The gathered information may comprise either an intraframe characteristic or an interframe characteristic. A second encoding subsystem, coupled to the first encoding subsystem, encodes the sequence of video frames employing at least one controllable parameter. The second encoding subsystem dynamically adapts intraframe or interframe encoding of the sequence of video frames by adjusting the at least one controllable parameter used in the encoding process in response to the derived information from the first encoding subsystem.

26 Claims, 6 Drawing Sheets

ADAPTIVE REAL-TIME ENCODING OF VIDEO SEQUENCE EMPLOYING IMAGE STATISTICS

TECHNICAL FIELD

This invention relates in general to compression of digital visual images, and more particularly, to a technique for real-time encoding of a video sequence using image statistics derived from the video sequence to dynamically change one or more controllable encoding parameter(s) from frame to frame or within a frame.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand and video conferencing to subscribers, an enormous amount of network bandwidth is required. In fact, network bandwidth is often the main inhibitor in the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real-time.

One example of an emerging video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform, quantization, and variable length coding. Video compression between pictures is accomplished via a process referred to as motion estimation and compensation, in which a motion vector plus difference data is used to describe the translation of a set of picture elements (pels) from one picture to another.

The ISO MPEG-2 standard specifies only the syntax of bitstream and semantics of the decoding process. The choice of coding parameters and tradeoffs in performance versus complexity are left to the encoder developers.

One aspect of the encoding process is compressing a digital video image into as small a bitstream as possible while still maintaining video detail and quality. The MPEG standard places limitations on the size of the bitstream, and requires that the encoder be able to perform the encoding process. Thus, simply optimizing the bit rate to maintain desired picture quality and detail can be difficult.

For example, a bit rate is defined in bits per second. Based on the frame rate and type of picture being encoded, a number of bits per picture is assigned. At 6,000,000 bits per second (6 Mbps), and pictures at 30 picture frames per second, each picture would be allocated 200,000 bits assuming that the bits are allocated uniformly. With a 720×480 picture having 1350 macroblocks, this translates into 148 bits allocated per macroblock. Thus, in the case of scene changes and action videos, the bit rate can be quickly consumed with drastic changes between macroblocks and/or between frames. Picture quality and detail can suffer as a result.

In view of the above-noted constraints, therefore, this invention seeks to enhance picture quality of an encoded video sequence while still obtaining a high compression rate by providing an adaptive real-time encoding scheme.

DISCLOSURE OF THE INVENTION

Briefly summarized, this invention comprises in one aspect a method for encoding a sequence of video frames. The method includes: analyzing the sequence of video frames to derive information on at least one characteristic thereof, the at least one characteristic comprising at least one of an intraframe characteristic or an interframe characteristic; encoding the sequence of video frames employing at least one controllable parameter; and dynamically adapting the encoding of the sequence of video frames using the information on the at least one characteristic thereof to adjust the at least one controllable parameter employed in encoding the sequence of video frames. Advantageously, the encoding is dynamically adaptive to change in the at least one characteristic of the sequence of video frames.

In another aspect, the invention comprises a system for encoding a sequence of video frames. The system includes means for analyzing the sequence of video frames to derive information on at least one characteristic thereof. The at least one characteristic comprises at least one of an intraframe characteristic or an interframe characteristic. The system further includes means for encoding the sequence of video frames employing at least one controllable parameter, and means for dynamically adapting the encoding of the sequence of frames using the derived information on the at least one characteristic thereof. The information is used to adjust the at least one controllable parameter employed during encoding the sequence of video frames such that the encoding process is dynamically adaptive to change in the at least one characteristic of the sequence of video frames being encoded.

In a further aspect, the invention comprises a computer program product including a computer usable medium having computer readable program code means therein for use in encoding a sequence of video frames. The computer readable program product means in the computer program product includes computer readable program code means for causing a computer to affect: analyzing of the sequence of video frames to derive information on at least one characteristic thereof, the at least one characteristic comprising at least one of an intraframe characteristic or an interframe characteristic; encoding of the sequence of video frames employing at least one controllable parameter; and dynamically adapting the encoding of the sequence of video frames using the information on the at least one characteristic thereof to adjust the at least one controllable parameter employed in encoding the sequence of video frames.

In general, encoding in accordance with the principles of the present invention results in improved picture quality compared with non-adaptive encoder systems, especially at low bit rates. This is because, for example, employing adaptive bit allocation among frames (as well as within frames) is more critical in low bit rate encoding compared with higher bit rate encoding. Further, the encoding technique of this invention can insure a semi-constant picture quality of a decoded video sequence in constant bit rate (CBR) mode or a constant picture quality in variable bit rate (VBR) encoding mode.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
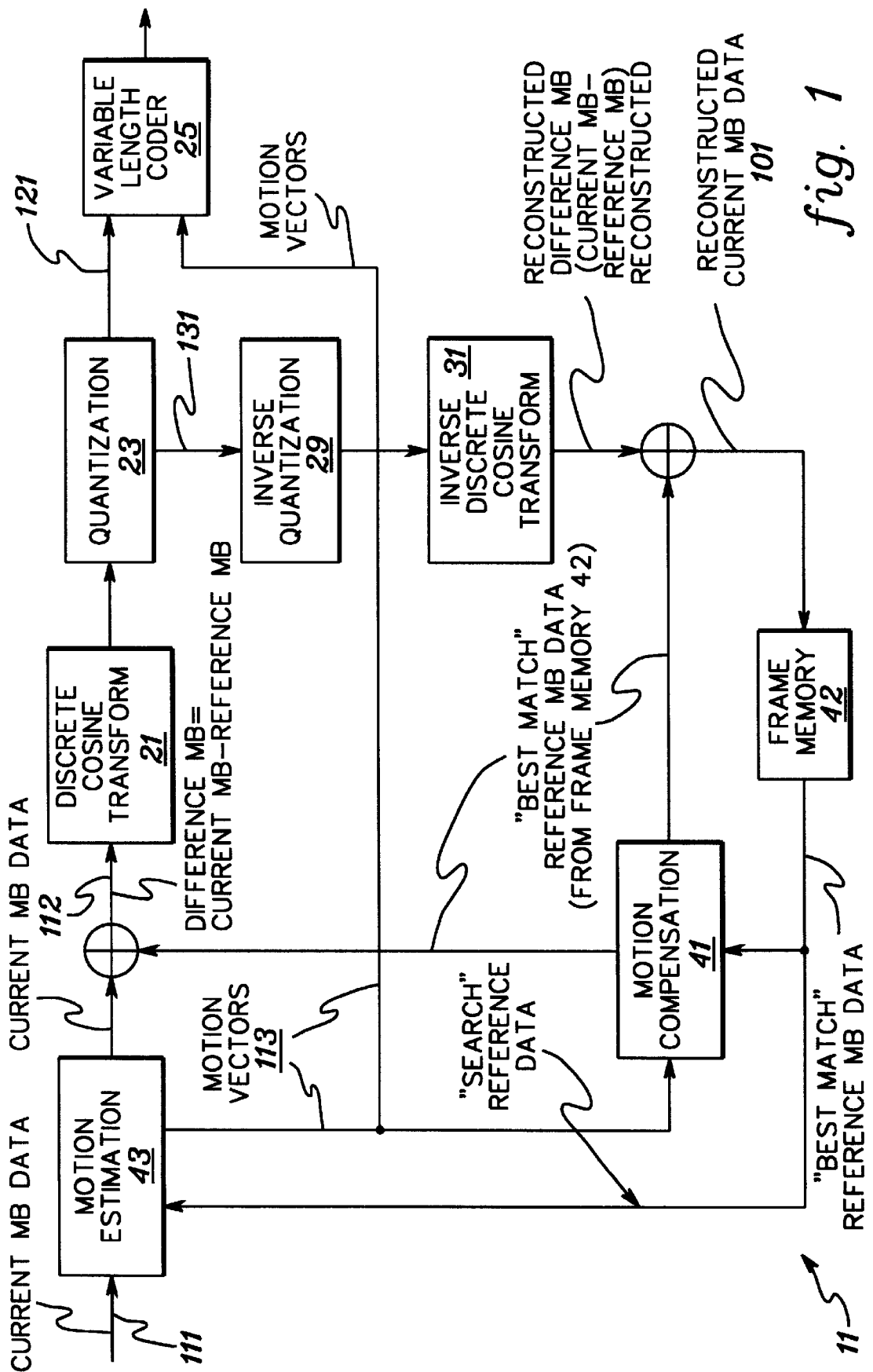
FIG. 1 shows a flow diagram of a generalized MPEG-2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the $i^{th}$ picture input 111, difference data 112, motion vectors 113 (to motion compensation 41 and to variable length coder 25), the picture output 121, the feedback picture for motion estimation and compensation 131, and the motion compensated picture 101. This figure has the assumptions that the $i^{th}$ picture exists in frame memory or frame store 42 and that the $i+1^{th}$ is being encoded with motion estimation.

The invention relates, for example, to MPEG compliant encoders and encoding processes such as described in "Information Technology-Generic coding of moving pictures and associated audio information: Video," Recommendation ITU-T H.262, ISO/IEC 13818-2, Draft International Standard, 1994. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are used for temporal compression functions. Spatial and temporal compression are repetitive functions with high computational requirements.

More particularly the invention relates, for example, to a process for performing spatial and temporal compression including discrete cosine transformation, quantization, entropy encoding, motion estimation, motion compensation, and prediction, and even more particularly to a system for accomplishing spatial and temporal compression.

The first compression step is the elimination of spatial redundancy, for example, the elimination of spatial redundancy in a still picture of an "I" frame picture. Spatial redundancy is the redundancy within a picture. The MPEG-2 Draft Standard is using a block based method of reducing spatial redundancy. The method of choice is the discrete cosine transformation, and discrete cosine transform coding of the picture. Discrete cosine transform coding is combined with weighted scalar quantization and run length coding to achieve desirable compression.

The discrete cosine transformation is an orthogonal transformation. Orthogonal transformations, because they have a frequency domain interpretation, are filter bank oriented. The discrete cosine transformation is also localized. That is, the encoding process samples on an 8×8 spatial window which is sufficient to compute 64 transform coefficients or sub-bands.

Another advantage of the discrete cosine transformation is that fast encoding and decoding algorithms are available. Additionally, the sub-band decomposition of the discrete cosine transformation is sufficiently well behaved to allow effective use of psychovisual criteria.

After transformation, many of the frequency coefficients are zero, especially the coefficients for high spatial frequencies. These coefficients are organized into a zig-zag or alternate-scanned pattern, and converted into run-amplitude (run-level) pairs. Each pair indicates the number of zero coefficients and the amplitude of the non-zero coefficient. This is coded in a variable length code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

For purposes of illustration, a generalized flowchart of MPEG compliant encoding is shown in FIG. 1. In the flowchart the images of the $i^{th}$ picture and the $i+1^{th}$ picture are processed to generate motion vectors. The motion vectors predict where a macroblock of pixels will be in a prior and/or subsequent picture. The use of the motion vectors is a key aspect of temporal compression in the MPEG standard. As shown in FIG. 1 the motion vectors, once generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111 of a subsequent picture goes to the motion estimation unit 43 of the encoder. Motion vectors 113 are formed as the output of the motion estimation unit 43. These vectors are used by the motion compensation Unit 41 to retrieve macroblock data from previous and/or future pictures, referred to as "reference" data, for output by this unit. One output of the motion compensation Unit 41 is negatively summed with the output from the motion estimation unit 43 and goes to the input of the Discrete Cosine Transformer 21. The output of the discrete cosine transformer 21 is quantized in a quantizer 23. The output of the quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in frame memory 42. In the encoder shown for purposes of illustration, this second output 131 goes through an inverse quantization 29 and an inverse discrete cosine transform 31 to return a lossy version of the difference macroblock. This data is summed with the output of the motion compensation unit 41 and returns a lossy version of the original picture to the frame memory 42.

Figure 2:
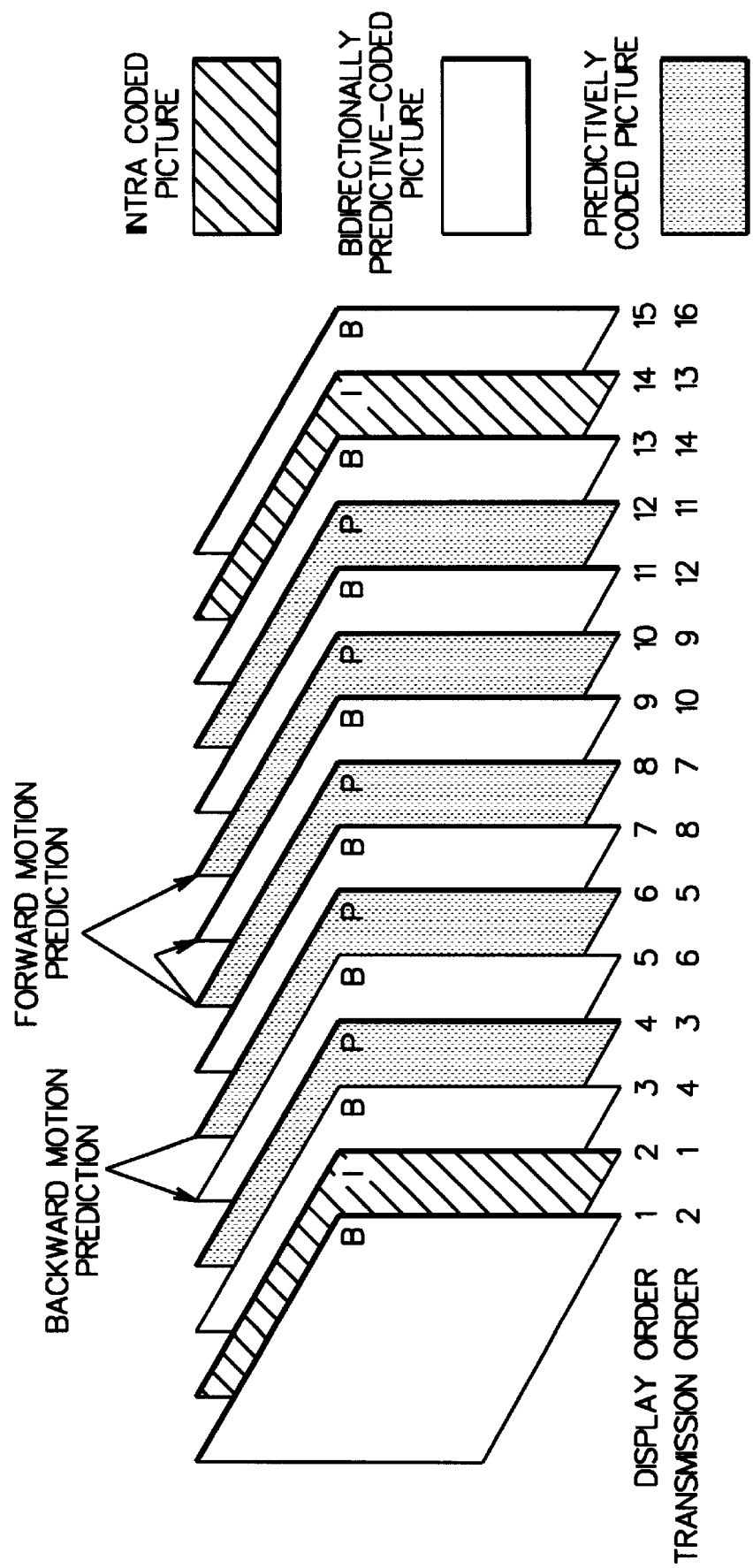
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a reference image for motion estimation. There are "Predicted pictures" or "P" pictures which are formed by motion vectors from a previous picture and can serve as a reference image for motion estimation for further pictures. Finally, there are "Bidirectional pictures" or "B" pictures which are formed using motion vectors from two other pictures, one past and one future, and can not serve as a reference image for motion estimation. Motion vectors are generated from "I" and "P" pictures, and are used to form "P" and "B" pictures.

Figure 3:
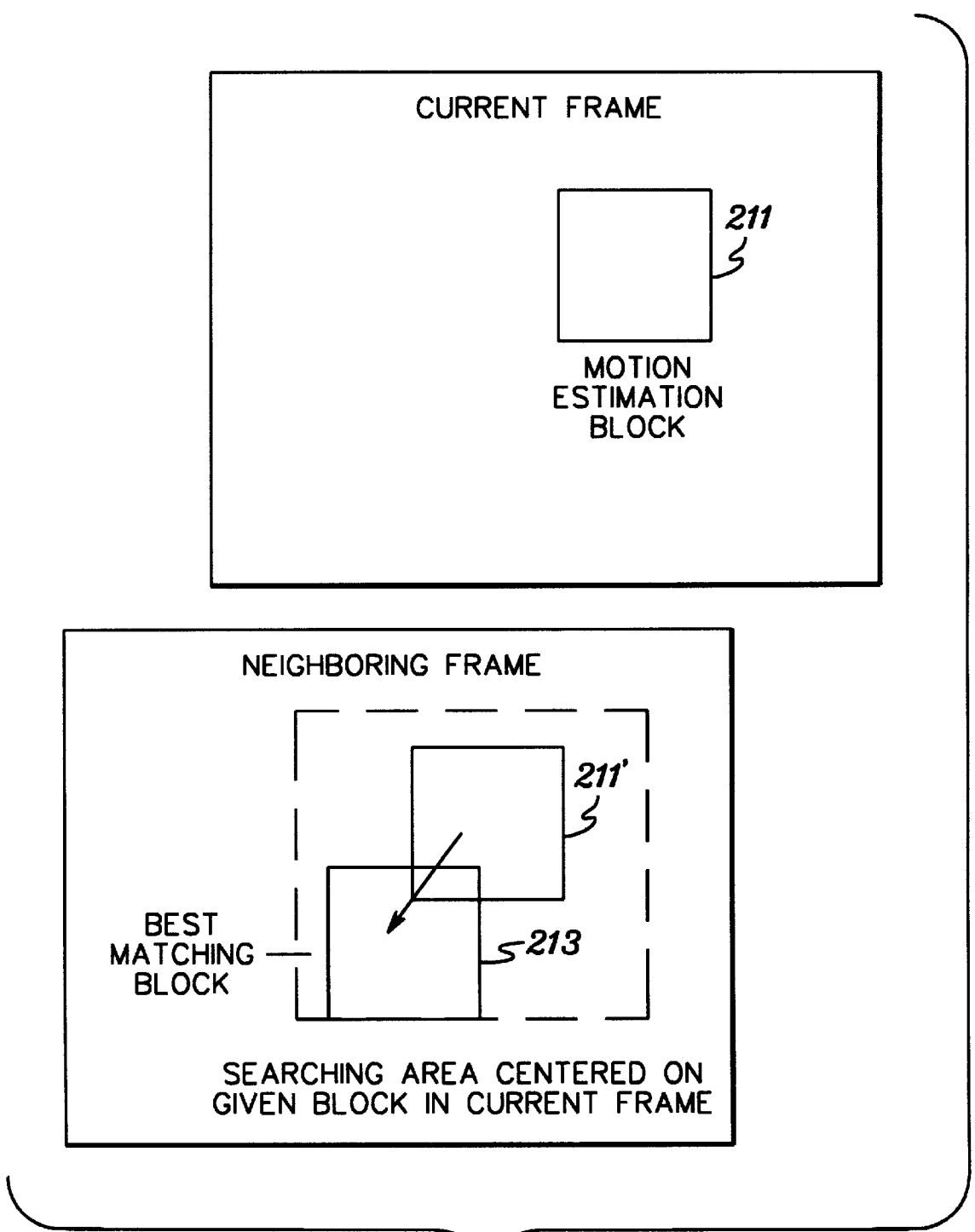
FIG. 3 illustrates the search from the motion estimation block in the current frame or picture to the best matching block in a subsequent or previous frame or picture. Elements 211 and 211' represent the same location in both pictures.
Figure 4:
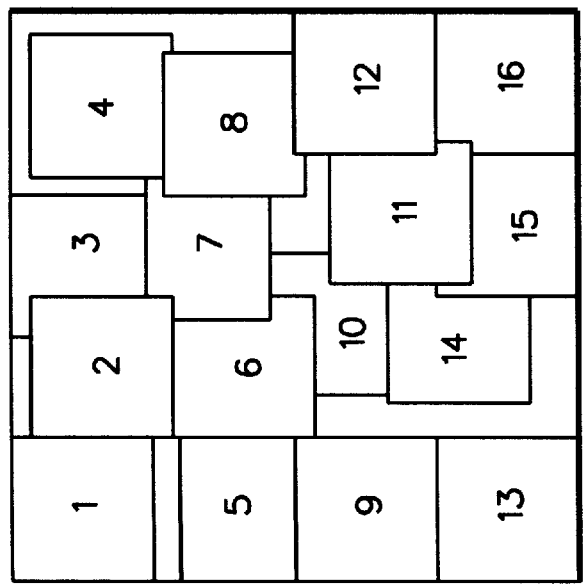
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout a region of the next picture to find the best match macroblock 213. Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in shading and illumination.

Returning to FIG. 3, we look for a good match by starting from the same location in the $i^{th}$ picture as in the $i+1^{th}$ picture. A search window is created in the $i^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The operational functions of an MPEG-2 encoder are discussed in detail in commonly assigned, co-pending U.S. patent application Ser. No. 08/831,157, by Carr et al., filed Apr. 1, 1997, entitled "Control Scheme For Shared-Use Dual-Port Predicted Error Array," which is hereby incorporated herein by reference in its entirety.

As noted initially, encoder performance and/or picture quality may be enhanced in accordance with the principles of this invention through real-time adaptive video encoding. The video encoder is constructed to be adaptive to the video data received as a sequence of frames. In accordance with one embodiment of this invention, two encoding subsystems are employed. A significant advantage of using two encoding subsystems is the ability to analyze the video sequence prior to its real-time encoding. Analysis of the video sequence comprises calculating one or more statistics which can be derived from the video data.

The statistical measures can describe different characteristics of an image frame, for example, busyness of a frame, motion between image frames, scene change or fading, etc. Using the calculated statistics, adaptive encoding of the video sequence is then carried out by controlling one or more encoding parameters of the real-time encoding process. For example, bit allocation, quantization parameter(s), encoding mode, etc., can be changed from frame to frame or macroblock to macroblock within a given frame according to derived statistics of a characteristic (e.g., scene content) of the particular frame(s).

Figure 5:
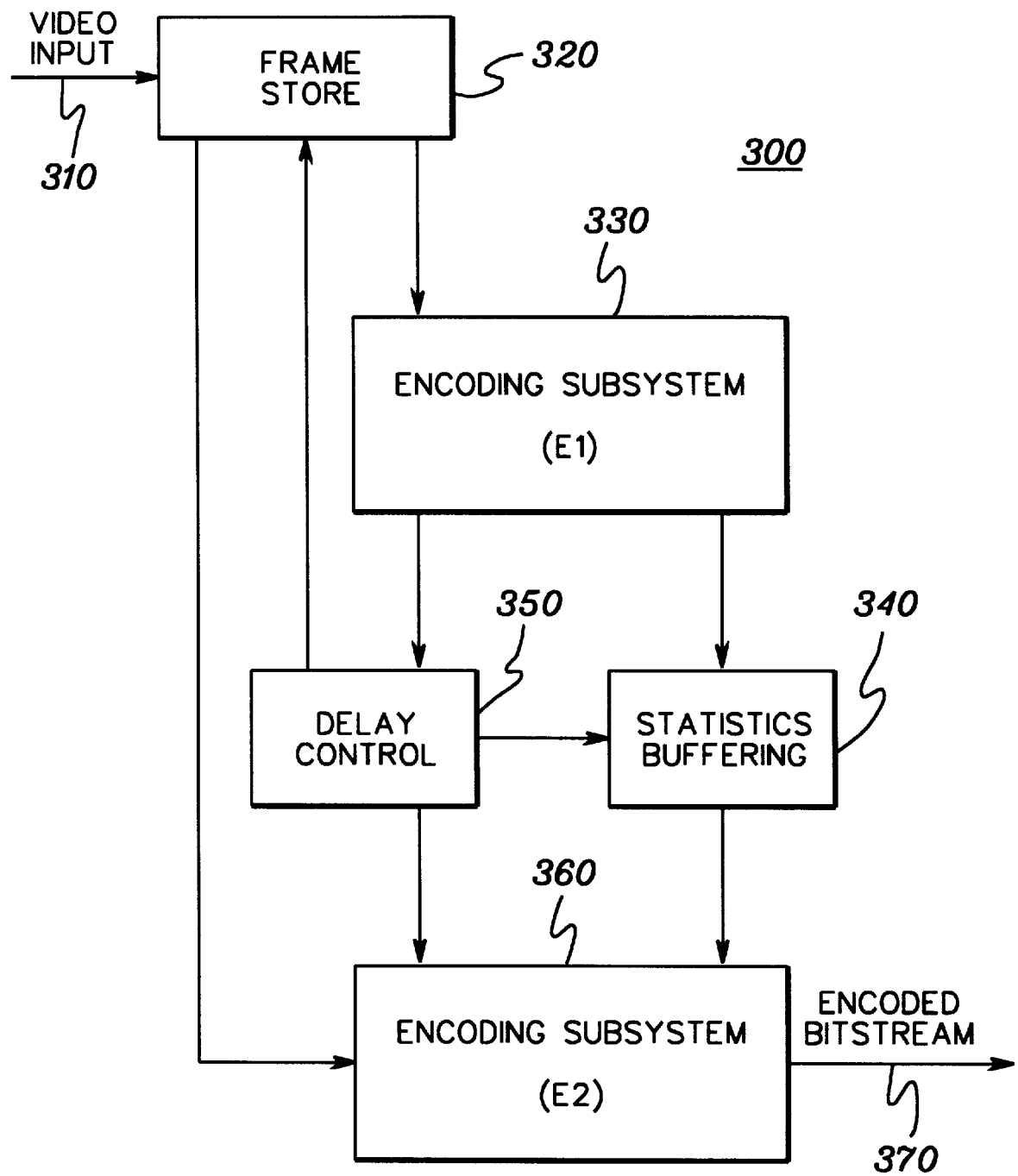
FIG. 5 shows a flow diagram of an encoding system 300 employing a first encoding subsystem E1 and a second encoding subsystem E2 in accordance with the principles of the present invention. Subsystem E1 is configured to derive statistics on one or more characteristics of a sequence of frames to be encoded. These characteristics are employed by subsystem E2 to adaptively encode the sequence of frames to optimize picture quality and/or encoding performance.

One embodiment of an encoding system, generally denoted 300, in accordance with the principles of this invention is depicted in FIG. 5. The MPEG Standard is again assumed herein for purposes of explanation; however, those skilled in the art will understand that other implementations and standards can employ the adaptive encoding concepts of this invention. System 300 includes two encoder subsystems, designated E1 330 and E2 360. In one implementation, encoder subsystems E1 and E2 are assumed to have identical hardware, but different software as described hereinbelow. E1 is programmed to generate the desired statistics, such as interframe/intraframe non-motion, motion, etc. statistics, which are important to the encoding subsystem's (E2) specific bit rate control algorithm. E2 generates encoded frames based on the statistics generated by encoding subsystem E1.

Operationally, a sequence of video frames 310 is initially received into a frame store 320, where one or more frames are buffered depending upon the encoding specification (e.g., I, IP, IBP, IBBP encoding). This is accomplished by partitioning frame store 320 into an appropriate number of picture buffers (determined by group of picture (GOP) structure). These partitions are managed by a delay control logic 350. After sufficient delay, again determined by implementation, the video frame information is passed to encoder subsystem E1 330, which derives the information on image statistics and stores this information in a statistics buffer 340 on a frame-by-frame basis. The delay control hardware 350 manages buffering of incoming video data and of image statistics, and feeds the video frames from frame store 320, as well as the derived statistics from statistics buffering 340, to encoding subsystem E2 360 in encode order. Using these statistics, subsystem E2 adaptively encodes the frames as described further below and outputs the encoded bitstream 370 in real time, delayed only by sufficient frame time to allow encoding subsystem E1 to generate the statistics on one or more characteristics of the received video input 310.

Figure 6:
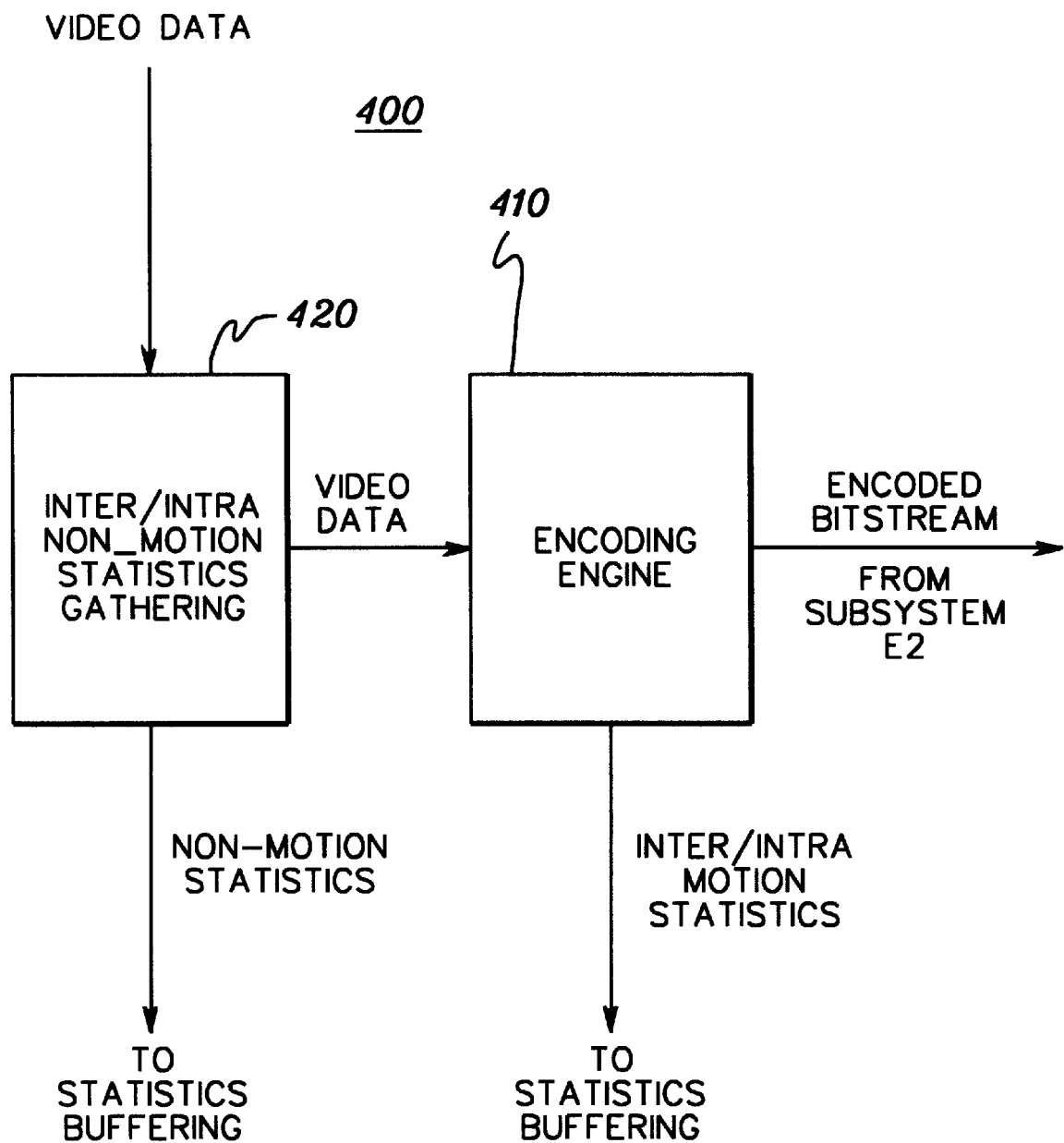
FIG. 6 is a generalized diagram of an encoding subsystem in accordance with the present invention. Subsystem E1 is employed to generate, for example, non-motion statistics and inter/intra motion statistics using non-motion statistics gathering 420 and encoding engine 410, respectively, while subsystem E2 generates the encoded bitstream using encoding engine 410.

A block diagram of a generalized encoding subsystem, denoted 400, is depicted in FIG. 6. System 400 comprises hardware/software for calculating non-motion statistics 420 on the video data as it is received in the encoding subsystem, as well as an encoding engine 410 which consists of hardware/software to perform the actual video compression, i.e., motion estimation, motion compensation, quantization, variable length coding, etc. Encoding subsystem E1 330 (FIG. 5) will employ both statistics gathering logic 420 and encoding engine 410, while encoding subsystem E2 360 (FIG. 5) will only employ encoding engine 410. Thus, during a first pass of encoding, i.e., via subsystem E1, motion statistics based on motion vectors are calculated by encoding engine 410. Encoding subsystem E2 then outputs an encoded bitstream using a second pass through encoding engine 410.

Real time operation, and associated frame delays of a system in accordance with this invention, is demonstrated in the MPEG-2 example of Table 1. In this example, one B picture is assumed between two anchor pictures (IBPBPBP . . . ) and non-motion statistics are being collected. Only one frame of video data is buffered before the statistical calculation, and the delay between input and output of the frames is a maximum of four frame times in the example.

Frame statistics can generally be divided into two groups, i.e., intraframe and interframe statistics. Intraframe statistics are calculated using only pixel data within a frame, while interframe statistics are obtained using several consecutive images from an image sequence (generally two consecutive images). Intraframe and interframe statistics can be further divided into global and local quantities. Global quantities describe characteristics of entire image frames, and local statistical values are calculated for each subdivision of a frame, e.g., for each macroblock of a frame. The statistics presented herein can be calculated from luminance data, however, additional statistics can be derived from chrominance data as well.

Intraframe Statistics
Global Quantities
   Average Interpixel Difference (AID) of a frame—AID is the average of absolute differences between two consecutive pixels in the image lines of a frame. The higher the AID, the higher the details in a frame. This quantity is calculated by hardware in the pixel interface as pixels for the frame pass through.
   Average Activity (AVACT) of a frame—AVACT is estimated as the average of the macroblock variances in a frame. A macroblock variance can be estimated as statistical averages from the pixel values of a macroblock. The average activity gives information about the busyness of a picture.
Local Quantities
   During the calculation of the above global quantities, local measures can also be obtained. Thus, for each subdivision, e.g. macroblock (MB), the MB-AID and MB-AVACT statistics can be stored and then used by subsystem E2 for local adaptive encoding of a frame.

TABLE 1

| Input | Buffer1 | Buffer2 | Buffer3 | Buffer4 | Buffer5 | Encoder #1 | Encoder #2 | |
|---|---|---|---|---|---|---|---|---|
| n     | n     | —     | —     | —     | —     | —     | —     |     |
| n + 1 | n     | n + 1 | —     | —     | —     | n     | —     |     |
| n + 2 | n     | n + 1 | n + 2 | —     | —     | n + 1 | —     |     |
| n + 3 | n     | n + 1 | n + 2 | n + 3 | —     | n + 2 | n     | (I) |
| n + 4 | n     | n + 1 | n + 2 | n + 3 | n + 4 | n + 3 | n + 2 | (P) |
| n + 5 | n + 5 | n + 1 | n + 2 | n + 3 | n + 4 | n + 4 | n + 1 | (B) |
| n + 6 | n + 5 | n + 6 | n + 2 | n + 3 | n + 4 | n + 5 | n + 4 | (P) |
| n + 7 | n + 5 | n + 6 | n + 7 | n + 3 | n + 4 | n + 6 | n + 3 | (B) |
| n + 8 | n + 5 | n + 6 | n + 7 | n + 8 | n + 4 | n + 7 | n + 6 | (P) |
| n + 9 | n + 5 | n + 6 | n + 7 | n + 8 | n + 9 | n + 8 | n + 5 | (B) |

Other implementations will be apparent to those skilled in the art employing the principles of the present invention. For example, video data could be input into a frame store in parallel with inputting it into the first encoding subsystem E1 if the video data has no B pictures and the statistics are intraframe.

Examples of statistics calculated in encoding subsystem E1 are next described.

As noted, encoding subsystem E1 calculates statistics from the image data. Based upon these statistics, the subsystem can also carry out preprocessing steps, such as identifying scene change or fade detection. The particular statistics calculated by subsystem E1 depend on the given implementation of a rate control algorithm within subsystem E2. In MPEG-2 encoding, there is a wide range of picture statistics that can be used to determine the quantization for a frame or within a frame. The statistics discussed hereinbelow are provided by way of example only and other E2 video compression algorithms may employ different picture quantities.

Interframe Statistics
   These statistics describe the relationship between consecutive frames of an image sequence, e.g. occurrence of motion, scene change, fading, or identifying noise in a macroblock.
Global Quantities
   Average Frame Difference (AFD) of a frame—AFD is the average of absolute differences between the luminance pixel value of the current picture and the pixel at the same location in the previous frame.
   Variance of the DFD (Displaced Frame Difference)—To obtain DFD at a pixel, motion vectors have to be calculated for each macroblock using two consecutive frames. DFD is the difference between a pixel value at the current frame and the corresponding (displaced by an estimated motion vector) pixel value in the previous or future frame. Variance can be estimated as statistical average of DFDs, which are calculated for each pixel of the entire frame.

Local Quantities
  Variance of DFD for macroblock. Same as the global quantity, but the variance is estimated for a macroblock.
  Variance of motion vectors (difference between neighboring motion vectors)

Scene Change Detection

Consider two consecutive frames. The above statistics (global and local) are available for each frame. There are different possibilities to detect scene changes; for example:

a) If ((AVACT(i)−AVACT(i−1))>threshold1), then frame i belongs to the new scene. Threshold1 is determined experimentally.

b) If ((AID(i)−AID(i−1))>threshold2) then frame i belongs to the new scene. Threshold2 is determined experimentally.

c) Combination of conditions a) and b).

d) If ((AFD)>threshold3), then frame i belongs to the new scene. Threshold3 is determined experimentally.

e) Scene change detection—interframe statistics. If (DFD variance>threshold4) and if ((AID(i)−AID(i−1))>threshold2), then frame i belongs to the new scene. Thresholds are determined experimentally. Threshold4 has to be chosen carefully, because only one motion vector is available for a macroblock (MB) and it is not necessarily the true motion vector for each pixel in the MB.

If a scene change is detected, this will be communicated to system E2. Subsystem E2 may react by disregarding any information from the previous picture which belongs to the previous scenes. E2 can also rearrange the encoding modes of the pictures: e.g., the first picture that belongs to the new scene may be coded as an I picture.

Fade Detection

A fade is basically a slow scene change, whereby the frames change gradually, in contrast to a true scene cut where the change is abrupt. A fade has two directions, 1) the first scene dissolving into the fade, and 2) the fade crystallizing into the second scene.

The presence of a fade and its direction may be determined by a percentage of interpixel sums delta with respect to a previous frame, i.e., if the value of the sum of the pixels of frame N+1 differs by an experimentally determined percentage from frame N, then a fade is occurring. Its direction is determined by the sign of the magnitude, i.e., being greater or less than zero. If a fade is detected, this is communicated to E2.

As noted above, encoder subsystem E2 can have the same encoding engine architecture as encoder subsystem E1, however, the statistics gathering hardware/software would not be employed by subsystem E2. Adaptive encoding of a frame sequence is carried out by the rate control algorithm of the encoding engine, i.e., using the above-generated statistics. This is a 2-step process.

At first, bit allocation is defined for each picture depending on the bit rate, encoding mode and the relative characteristics of the frames to each other. Then, a corresponding quantization parameter (QUANT) is defined. In an MPEG-2 compatible bitstream, the QUANT value can change from macroblock to macroblock allowing locally adaptive quantization inside a frame. In accordance with this invention, a first global QUANT value is defined for each picture using the global quantities described above. The QUANT value for a particular macroblock is then obtained by modulating the global QUANT value based on the local statistics of the macroblock.

By detecting scene change within encoding subsystem E1, and with a prior knowledge of picture statistics, after detection of a scene change information from previous pictures which belongs to the previous scene can be discarded. For example, a new group of pictures (GOP) can be started with the new scene. The global QUANT values can be calculated for the frames of the new GOP using predefined initial rate control parameters instead of using parameters from the old scene.

If a fade is detected by subsystem E1, then subsystem E2 may react by using the proper reference frames for motion estimation/compensation, and/or change the encoding mode of frames. An example of this may be forcing an I picture, or coding all macroblocks in a P or B picture as intra-macroblocks.

Locally adaptive quantization is also possible. The aim in this approach would be to distribute allocated bits among the macroblocks based on scene content. One possible approach would be to employ AVACT of the current picture to be encoded. The MB-AVACT for each macroblock are also stored in the statistics buffering. A QUANT value of an MB is obtained by modulating the global QUANT value by the ratio of the AVACT and the MB-AVACT. For example, if the macroblock activity is high with respect to the picture AVACT, then the QUANT of this particular macroblock will be increased with respect to the global QUANT, and vice versa.

Pursuant to the adaptive encoding system of this invention, the local statistics can also be employed to identify noisy macroblocks within a picture. If a macroblock has a high DFD value and its activity is also high, the macroblock can be declared noisy. A noisy macroblock can then be encoded by a high QUANT value, which results in bit savings. These extra bits can be used for encoding noiseless macroblocks within the frame. Consequently, the overall quality of the picture will be improved.

One example of a manner in which the encoding system of this invention performs the function of locally adaptive quantization may be the following. To determine the quantization value for each macroblock, the encoding subsystem would receive the MB-AVACT and DFD from the statistics store 340 (FIG. 5) for that macroblock. Subsystem E2 would then use these values in determining the most efficient QUANT value for the macroblock.

Those skilled in the art will note from the above discussion that encoding in accordance with the principles of the present invention results in improved picture quality compared with non-adaptive encoder systems, especially at low bit rates. This is because employing adaptive bit allocation among frames, as well as within frames, is more critical in low bit rate encoding compared with higher bit rate encoding. Further, the encoding technique of this invention can insure a semi-constant picture quality of a decoded video sequence in constant bit rate (CBR) mode or a constant picture quality in variable bit rate (VBR) encoding mode.

The present invention can be included, for example, in an article of manufacture (e.g., one or more computer program products) having, for instance, computer usable media. The media has embodied therein, for instance, computer readable program code means for providing and facilitating the capabilities of the present invention. The articles manufactured can be included as part of the computer system or sold separately.

The flow diagrams depicted herein are provided by way of example. There may be variations to these diagrams or the steps or operations described herein without departing from the spirit of the invention. For instance, in certain cases the steps may be performed in differing order, or steps may be added, deleted or modified. All these variations are considered to comprise part of the present invention as recited in the appended claims.

While the invention has been described in detail herein in accordance with certain preferred embodiments thereof, many modifications and changes therein may be affected by those skilled in the art. Accordingly, it is intended by the appended claims to cover all such modifications and changes as fall within the true spirit and scope of the invention.

We claim:

1. A method for encoding a sequence of video frames comprising:

analyzing the sequence of video frames to derive information on at least one characteristic thereof, said at least one characteristic comprising at least one of an intraframe characteristic or an interframe characteristic;

encoding the sequence of video frames employing at least one controllable parameter;

buffering the sequence of video frames and controlling timing of said encoding of the sequence of video frames so that for each frame of at least some frames of said sequence of video frames said analyzing precedes said encoding to derive said information on the at least one characteristic relative each frame of said at least some frames of the sequence of video frames prior to said encoding of the frame; and dynamically adapting said encoding of the sequence of video frames using said information on the at least one characteristic thereof to adjust said at least one controllable parameter employed in encoding the sequence of video frames, wherein said encoding is dynamically adaptive to change in the at least one characteristic of the sequence of video frames.

2. The method of claim 1, wherein said analyzing comprises dynamically analyzing the sequence of video frames to derive statistics on said at least one characteristic thereof, said statistics comprising at least one of motion statistics, non-motion statistics, scene change statistics, or scene fade statistics.

3. The method of claim 2, wherein said analyzing comprises deriving said statistics from at least one of luminance data and chrominance data of the sequence of video frames.

4. The method of claim 2, wherein said statistics comprise either global statistics or local statistics, said global statistics comprising statistics on an entire video frame, and said local statistics comprising statistics on a subdivision, picture region, slice, macroblock or block within a video frame of the sequence of video frames.

5. The method of claim 4, wherein said analyzing comprises determining intraframe statistics for a video frame, said intraframe statistics comprising at least one of an average interpixel difference (AID) of the video frame or an average activity (AVACT) of the video frame.

6. The method of claim 4, wherein said analyzing comprises determining interframe statistics, said interframe statistics comprising at least one of an average frame difference (AFD), or a variance of a displaced frame difference (DFD).

7. The method of claim 2, wherein upon said analyzing deriving scene change statistics, said encoding further comprises either disregarding information from a previous frame belonging to a previous scene or rearranging encoding modes of the sequence of video frames.

8. The method of claim 1, wherein said buffering comprises buffering the sequence of video frames within a frame store and said controlling comprises controlling timing of said encoding of the sequence of video frames so that for each frame of said sequence of video frames said analyzing precedes said encoding to derive said information on the at least one characteristic relative to each frame of the sequence of video frames prior to said encoding of the frame.

9. The method of claim 1, wherein said analyzing comprises employing a first encoding subsystem to derive said information on said at least one characteristic of the sequence of video frames, and said encoding comprises employing a second encoding subsystem to encode the sequence of video frames using said at least one controllable parameter, said second encoding subsystem being coupled to receive said information from said first encoding subsystem, said dynamically adapting comprising employing said information on the at least one characteristic of the sequence of video frames to dynamically control the at least one controllable parameter employed by said second encoding subsystem in encoding the sequence of video frames.

10. The method of claim 1, wherein said at least one controllable parameter employed by said encoding comprises at least one of bit allocation, a quantization parameter, or an encoding mode.

11. A system for encoding a sequence of video frames comprising:

means for analyzing the sequence of video frames to derive information on at least one characteristic thereof, said at least one characteristic comprising at least one of an intraframe characteristic or an interframe characteristic;

means for encoding the sequence of video frames employing at least one controllable parameter;

means for buffering the sequence of video frames and means for controlling timing of said encoding of said sequence of video frames so that for each frame of at least some frames of said sequence of video frames said analyzing precedes said encoding to derive said information on the at least one characteristic relative to each frame of said at least some frames of the sequence of video frames prior to said encoding of said frame; and means for dynamically adapting said encoding of the sequence of video frames using said derived information on the at least one characteristic thereof to adjust said at least one controllable parameter employed in encoding the sequence of video frames, wherein said encoding is dynamically adaptive to change in the at least one characteristic of the sequence of video frames.

12. The system of claim 11, wherein said means for analyzing comprises a first encoding subsystem, and wherein said means for encoding and said means for dynamically adapting comprise a second encoding subsystem, said second encoding subsystem comprising means for encoding the sequence of video frames in real-time.

13. The system of claim 12, wherein said first encoding subsystem comprises interframe and intraframe non-motion statistics gathering logic and an encoding engine, said statistics gathering logic being for gathering non-motion statistics on the sequence of video frames and said encoding engine being for deriving interframe and intraframe motion statistics on the sequence of video frames.

14. The system of claim 12, wherein said means for buffering comprises a frame store for receiving the sequence of video frames, and said means for controlling comprises delay control logic for controlling output of the sequence of video frames from the frame store to the first encoding subsystem and to the second encoding subsystem so that for each frame said first encoding subsystem derives said information on said at least one characteristic prior to said second encoding subsystem beginning encoding of said frame.

15. The system of claim 14, further comprising a statistics buffer coupled between said first encoding subsystem and said second encoding subsystem, said first encoding subsystem comprising means for outputting said information on said at least one characteristic of said sequence of video frames to said statistics buffer, and said second encoding subsystem comprising means for receiving said information on said at least one characteristic of said sequence of video frames from said statistics buffer.

16. The system of claim 12, wherein said first encoding subsystem comprises means for dynamically analyzing the sequence of video frames to derive statistics on said at least one characteristic thereof, said statistics comprising at least one of motion statistics, non-motion statistics, scene change statistics, or scene fade statistics.

17. The system of claim 16, wherein said first encoding subsystem comprises means for deriving said statistics from at least one of luminance data and chrominance data of the sequence of video frames.

18. The system of claim 16, wherein said statistics comprise intraframe statistics for a video frame, said intraframe statistics comprising at least one of an average interpixel difference (AID) of the video frame or an average activity (AVACT) of the video frame.

19. The system of claim 16, wherein said statistics comprise interframe statistics, said interframe statistics comprising at least one of an average frame difference (AFD), or a variance of a displaced frame difference (DFD).

20. The system of claim 11, wherein said at least one controllable parameter employed by said means for encoding comprises at least one of bit allocation, a quantization parameter, or an encoding mode.

21. The system of claim 11, wherein said means for encoding comprises an MPEG compliant encoding engine.

22. A computer program product comprising a computer usable medium having computer readable program code means therein for use in encoding a sequence of video frames, said computer readable program code means in said computer program product comprising:

computer readable program code means for causing a computer to affect analyzing of the sequence of video frames to derive information on at least one characteristic thereof, said at least one characteristic comprising at least one of an intraframe characteristic or an interframe characteristic;

computer readable program code means for causing a computer to affect encoding the sequence of video frames employing at least one controllable parameter;

computer readable program code means for causing a computer to affect timing control over said analyzing and said encoding such that encoding of each frame of at least some frames of said sequence of video frames follows analyzing said frame of said at least some frames of said sequence of video frames to derive said information on the at least one characteristic relative to said frame before encoding of said frame; and computer readable program code means for causing a computer to affect dynamically adapting said encoding of the sequence of video frames using said information on the at least one characteristic thereof to adjust said at least one controllable parameter employed in encoding the sequence of video frames, wherein said encoding is dynamically adaptive to change in the at least one characteristic of the sequence of video frames.

23. The computer readable program code means of claim 22, wherein said computer readable program code means for causing a computer to affect analyzing of the sequence of frames comprises computer readable program code means for causing a computer to affect dynamically analyzing the sequence of video frames to derive statistics on the at least one characteristic thereof, said statistics comprising at least one of motion statistics, non-motion statistics, scene change statistics, or scene fade statistics.

24. The computer readable program code means of claim 22, wherein said computer readable program code means for causing a computer to affect analyzing of the sequence of video frames comprises computer readable program code means for causing a computer to affect deriving statistics on said at least one characteristic of said sequence of video frames from at least one of luminance data and chrominance data of said sequence of video frames.

25. The computer readable program code means of claim 22, wherein said computer readable program code means for causing a computer to affect timing control comprises computer readable program code means for causing a computer to affect timing control over said analyzing and said encoding such that encoding of each frame of said sequence of video frames follows analyzing said frame of said sequence of video frames to derive said information on the at least one characteristic relative to said frame before encoding of said frame.

26. The computer readable program code means of claim 22, wherein said at least one controllable parameter comprises at least one of bit allocation, a quantization parameter, or an encoding mode.

* * * * *